United States Patent
Shibata et al.

(10) Patent No.: US 8,101,040 B2
(45) Date of Patent: Jan. 24, 2012

(54) METHOD FOR PRODUCING FUSION-BONDED BODY

(75) Inventors: Yoshinori Shibata, Nagoya (JP); Shinsuke Hidaka, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 203 days.

(21) Appl. No.: 12/679,106

(22) PCT Filed: Sep. 17, 2008

(86) PCT No.: PCT/JP2008/066694
§ 371 (c)(1),
(2), (4) Date: Mar. 19, 2010

(87) PCT Pub. No.: WO2009/041315
PCT Pub. Date: Apr. 2, 2009

(65) Prior Publication Data
US 2010/0212823 A1    Aug. 26, 2010

(30) Foreign Application Priority Data
Sep. 24, 2007    (JP) .................... 2007-246351

(51) Int. Cl.
B29C 65/00    (2006.01)
B32B 37/00    (2006.01)
(52) U.S. Cl. ............. 156/273.9; 156/274.4; 156/308.2; 219/633; 219/634
(58) Field of Classification Search ......... 156/273.9, 156/274.4, 274.2; 219/633, 634
See application file for complete search history.

(56) References Cited

U.S. PATENT DOCUMENTS

| | | | |
|---|---|---|---|
| 4,673,450 A | 6/1987 | Burke | |
| 5,980,665 A * | 11/1999 | Childress | 156/92 |

FOREIGN PATENT DOCUMENTS

| | | | |
|---|---|---|---|
| JP | 62-62733 A | 3/1987 | |
| JP | 4-173232 A | 6/1992 | |
| JP | 4-504386 A | 8/1992 | |
| JP | 63-53013 A | 3/1998 | |
| JP | 11-90986 A | 4/1999 | |
| JP | 11-300836 A | 11/1999 | |
| JP | 2004-521972 A | 7/2004 | |
| JP | 2005-271050 A | 10/2005 | |
| WO | WO 9008027 A1 * | 7/1990 | |

OTHER PUBLICATIONS

Beevers A: "Welding: the way ahead for thermoplastics?"; Engineering (Incl. Machine Shop MAGAZI8NE), Engineering Design Council, London, GB, vol. 231, No. 10; Nov. 1, 1991, pp. 11ACE-12ACE, XP000274126 ISSN: 0013-7782.

* cited by examiner

Primary Examiner — John Goff
(74) Attorney, Agent, or Firm — Kenyon & Kenyon LLP

(57) ABSTRACT

A fusion-bonded body which includes a fusion-bonded part obtained by fusion-bonding to each other a first part to be fusion-bonded which comprises a first thermoplastic resin and first carbon fibers and a second part to be fusion-bonded which comprises a second thermoplastic resin and second carbon fibers. Also provided is a method for producing the fusion-bonded body which comprises a fusion-bonding step in which the first part to be fusion-bonded is brought into close contact with the second part to be fusion-bonded, an electric current is caused to flow through the two parts to generate heat and melt the first thermoplastic resin and second thermoplastic resin, and the molten resins are solidified to form a fusion-bonded part.

2 Claims, 10 Drawing Sheets

_US 8,101,040 B2_

METHOD FOR PRODUCING FUSION-BONDED BODY

This is a 371 national phase application of PCT/JP2008/066694 filed 17 Sep. 2008, claiming priority to Japanese Patent Application No. JP 2007-246351 filed 24 Sep. 2007, the contents of which are incorporated herein by reference.

FIELD OF THE INVENTION

The present invention relates to a method for producing a fusion-bonded body including a fusion-bonded part formed by fusion-bonding two or more parts to be fusion-bonded to each other, each part to be fusion-bonded including thermoplastic resin and carbon fibers.

BACKGROUND OF THE INVENTION

In the case where a resin composite including thermoplastic resin and carbon fibers is used for a body outer plate of a vehicle, for example, adhering is adopted as a joining method for joining the resin composites to each other.

The above resin composites are usually adhered with adhesive. However, a resin composite made of thermoplastic resin has no functional group contributing to enhancement of adhering strength. Thus, the resin composite without treatment exhibits low adhesion strength. It is therefore necessary to apply for example surface treatment to joining surfaces to be joined, leading to increases in time and cost. Furthermore, it also takes time to harden the adhesive.

As other welding (fusion-bonding) methods for resin composites, there are a hot-plate method and an ultrasonic wave vibration method. Either technique is hard to apply to large-sized components such as a body.

As the welding method for resin members, there has been known a technique for joining (fusion-bonding) a thermoplastic resin composition including a laser transmitting black coloring agent containing amine salt of anthraquinone dye or monoazo complex dye, from among the thermoplastic resin containing inorganic filler or reinforcer (Patent Literature 1).

CITATION LIST

Patent Literature

Patent Literature 1: JP 2004-521972 A

SUMMARY OF INVENTION

Technical Problem

However, if the resin member to be welded (fusion-bonded) has no laser transmitting property, the aforementioned welding (fusion-bonded) method using laser welding could not be adopted. Accordingly, the welding (fusion-bonded) using laser welding is limited to a resin member containing a laser transmitting coloring agent as well as the laser transmitting black coloring agent disclosed in Patent Literature 1. In particular, the resin composite made of carbon fibers does not allow a laser beam to pass through.

The present invention has been made on ground of the above circumferences and has a purpose to provide a fusion-bonded body producing method of producing a fusion-bonded body by easily fusion-bonding parts to be fusion-bonded to each other, each part to be fusion-bonded including thermoplastic resin and carbon fibers.

Solution to Problem

To achieve the above purpose, there is provided a method of producing a fusion-bonded body including a fusion-bonded part made of a first to-be-fusion-bonded part comprising first thermoplastic resin and first carbon fibers and a second to-be-fusion-bonded part comprising second thermoplastic resin and second carbon fibers, the first and second to-be-fusion-bonded parts being fusion-bonded to each other, the method comprising: a fusion-bonding step of forming the fusion-bonded part by bringing the first to-be-fusion-bonded part and the second to-be-fusion-bonded part into close contact with each other, flowing current through both to-be-fusion-bonded parts to heat themselves, and melting and solidifying the first thermoplastic resin and the second thermoplastic resin together, wherein the fusion-bonded body is produced by fusion-bonding a first resin part made of a material containing at least the first thermoplastic resin, the first resin part including the first to-be-fusion-bonded part, and a second resin part made of a material containing at least the second thermoplastic resin, the second resin part including the second to-be-fusion-bonded part, thereby forming the fusion-bonded part, the first to-be-fusion-bonded part is formed to have a larger content of the first carbon fibers than other portion of the first resin part, the second to-be-fusion-bonded part is formed to have a larger content of the second carbon fibers than other portion of the second resin part, the first to-be-fusion-bonded part includes groups of first perpendicular carbon fibers oriented in a direction perpendicular to a first contact surface to be brought into contact with the second to-be-fusion-bonded part, and the second to-be-fusion-bonded part includes groups of second perpendicular carbon fibers oriented in a direction perpendicular to a second contact surface to be brought into contact with the first to-be-fusion-bonded part.

The fusion-bonded body producing method of the invention includes a fusion-bonding step of forming the fusion-bonded part by bringing the first part to be fusion-bonded (the first to-be-fusion-bonded part) and the second part to be fusion-bonded (the second to-be-fusion-bonded part) into close contact with each other, supplying current thereto, thereby heating them. Accordingly, the fusion-bonded body can be produced in which the first to-be-fusion-bonded part and the second to-be-fusion-bonded part are fusion-bonded to each other.

Furthermore, the first to-be-fusion-bonded part contains more carbon fibers than in the other portions. The second to-be-fusion-bonded part contains more carbon fibers than in the other portions. Thus, when a current is supplied to the first to-be-fusion-bonded part and the second to-be-fusion-bonded part, a larger amount of current is allowed to flow, thereby reliably heating themselves to surely form the fusion-bonded part. On the other hand, the other portions may be foamed not to contain carbon fibers or to have an appropriate percentage content of carbon fibers according to other purposes (characteristics such as required strength and coefficient of elasticity).

In addition, in the fusion-bonded body producing method of the invention, the first to-be-fusion-bonded part and the second to-be-fusion-bonded part contain groups of the first perpendicular carbon fibers and groups of the second perpendicular carbon fibers respectively. Thus, when the first to-be-fusion-bonded part and the second to-be-fusion-bonded part are placed in close contact and then current is supplied in a direction perpendicular to the first contact surface and the second contact surface, that is, in the orientation direction, the current is allowed to flow along groups of the first perpendicular carbon fibers and groups of the second carbon fibers. The first and second to-be-fusion-bonded parts become low in resistance, thereby enabling passage of a large amount of current easily and reliably. This enables the generation of a large amount of heat. In the first to-be-fusion-bonded part and the second to-be-fusion-bonded part, therefore, the first thermoplastic resin and the second thermoplastic resin can be reliably melted. Consequently, the fusion-bonded body can be produced in which the first to-be-fusion-bonded part and the second to-be-fusion-bonded part are reliably fusion-bonded to each other.

The first to-be-fusion-bonded part and the second to-be-fusion-bonded part may be included in separate members. Specifically, the first to-be-fusion-bonded part may be included in the first member and the second to-be-fusion-bonded part may be included in the second member different from the first member. Alternatively, the first to-be-fusion-bonded part and the second to-be-fusion-bonded part may be included in the same member. Specifically, the first to-be-fusion-bonded part and the second to-be-fusion-bonded part may be included in a single member at different portions.

Each of the first to-be-fusion-bonded part and the second to-be-fusion-bonded part preferably be made of thermoplastic resin and carbon fibers. Accordingly, the first member or the single member may have the same percentage content (weight %) of carbon fibers in portions other than the first to-be-fusion-bonded part as that in the first to-be-fusion-bonded part and also the different percentage content of carbon fibers from that in the first to-be-fusion-bonded part. Also, the second member or the single member may have the same percentage content (weight %) of carbon fibers in portions other than the second to-be-fusion-bonded part as that in the second to-be-fusion-bonded part and also the different percentage content of carbon fibers from that in the second to-be-fusion-bonded part.

Moreover, the first member and the second member or the single member may be made of metal, ceramic, only different resin from that of the first and second to-be-fusion-bonded parts, or only carbon fibers, without containing one or both of thermoplastic resin and carbon fibers in the portions other than the first to-be-fusion-bonded part and the second to-be-fusion-bonded part.

The first carbon fibers and the second carbon fibers may be made in the form of for example fillers capable of dispersing in the thermoplastic resin and also in the form of a carbon fibers woven fabric or nonwoven fabric. In particular, a carbon fibers woven fabric contains fibers oriented in the same direction. In the case where a current is supplied in the extending direction of the carbon fibers, accordingly, electric resistance can be decreased, thereby enabling passage of a large amount of current. This is more preferable to enable generation of a large amount of heat by current supply.

Furthermore, in one of the above fusion-bonded body producing methods, preferably, each of the first to-be-fusion-bonded part and the second to-be-fusion-bonded part contains carbon fibers in a range of 60 to 90 wt %.

The first to-be-fusion-bonded part and the second to-be-fusion-bonded part each contain carbon fibers in a range of 60 to 90 wt %. Accordingly, when they are placed in close contact and supplied with a current, the current can be supplied more reliably through the carbon fibers as compared with a configuration containing less than 60 wt % of carbon fibers. In the carbon fibers through which the current flows, thus generating heat, the thermoplastic resin around those carbon fibers in the first to-be-fusion-bonded part or the second to-be-fusion-bonded part can be surely melted. Consequently, the first to-be-fusion-bonded part and the second to-be-fusion-bonded part can be fusion-bonded reliably to form the fusion-bonded body. On the other hand, when the percentage content of carbon fibers in the first to-be-fusion-bonded part or the second to-be-fusion-bonded part exceeds 90 wt %, the amount of thermoplastic resin is too small to make mutual fusion-bonding hard.

REFERENCE SIGNS LIST 100, 200 Fusion-bonded body
101, 201 Fusion-bonded part
110, 210 First resin member (First resin part)
111, 211 First part to be fusion-bonded
113, 213 First resin plate part (Other portion)
120, 220 Second resin member (Second resin part)
121, 221 Second part to be fusion-bonded
123, 223 Second resin plate part (Other portion)
212A First contact surface
222A Second contact surface
CF1 First carbon fibers
CF1$a$ First A-orientation carbon fibers (First carbon fibers, First perpendicular carbon fibers)
CF1$b$ First B-orientation carbon fibers (First carbon fibers)
CF1$c$ First C-orientation carbon fibers (First carbon fibers)
CF2 Second carbon fibers CF2a Second A-orientation carbon fibers (Second carbon fibers, Second perpendicular carbon fibers)
CF2b Second B-orientation carbon fibers (Second carbon fibers)
CF2c Second C-orientation carbon fibers (Second carbon fibers)
NA1 First resin (First thermoplastic resin)
NA2 Second resin (Second thermoplastic resin)

DETAILED DESCRIPTION

First Reference Example

A detailed description of a first reference example of the present invention will now be given referring to the accompanying drawings.

Figure 1A:
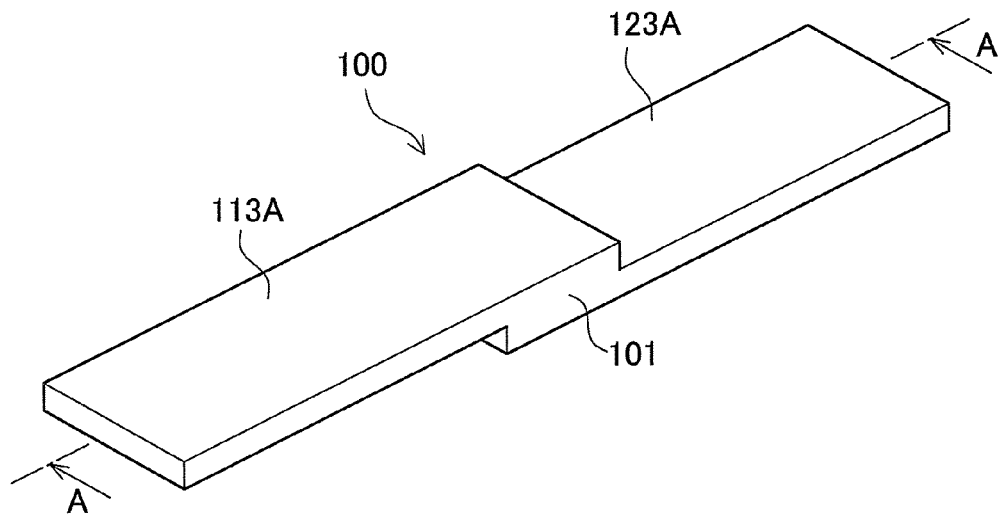
FIG. 1A is a perspective view to explain a fusion-bonded body in a first reference example.
Figure 1B:
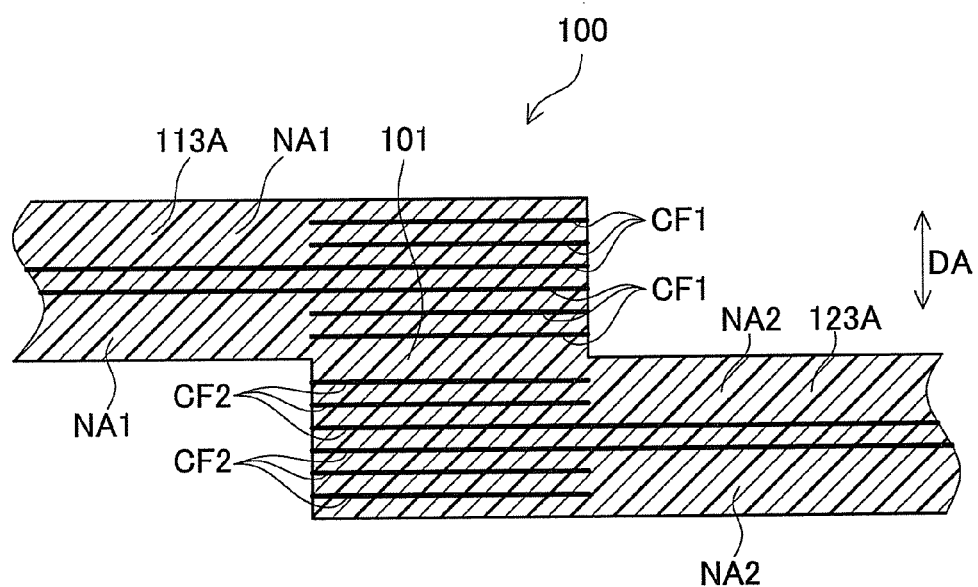
FIG. 1B is a partial enlarged sectional view (along A-A) of FIG. 1A.

FIGS. 1A and 1B show a fusion-bonded body 100 in the first reference example; FIG. 1A is a perspective view and FIG. 1B is a sectional view taken along a line A-A. This fusion-bonded body 100 includes a first resin plate part 113A having a rectangular plate-like shape and made of first resin NA1 (nylon 66) and a plurality of layers of groups of first carbon fibers CF1, each group being composed of carbon fibers arranged in parallel in a layer, a second resin plate part 123A having a rectangular plate-like shape and made of second resin NA2 (nylon 66) and a plurality of layers of groups of second carbon fibers CF2, each group being composed of carbon fibers arranged in parallel in a layer, and a fusion-bonded part 101 formed between the first resin plate part 113A and the second resin plate part 123A. As described later, this fusion-bonded body 100 is produced by fusion-bonding a first resin member 110 having a rectangular plate-like shape made of the first resin NA1 and the first carbon fibers CF1 and a second resin member 120 having a rectangular plate-like shape made of the second resin NA2 and the second carbon fibers CF2.

Of this fusion-bonded body 100, as shown in a sectional view in FIG. 1B, the first carbon fibers CF1 in the first resin plate part 113A and the second carbon fibers CF2 in the second resin plate part 123A are oriented in a direction (a horizontal direction in FIG. 1B) perpendicular to a thickness direction DA (a vertical direction in FIG. 1B). Each layer of the first carbon fibers CF1 and each layer of the second carbon fibers CF2 are arranged in parallel.

In the fusion-bonded part 101, the first resin NA1 and the second resin NA2 are melted and solidified together into an integral part. This fusion-bonded part 101 is made to have a higher percentage content (weight %) of the first carbon fibers CF1 and the second carbon fibers CF2 than other portions (the first resin plate part 113A and the second resin plate part 123A) of the fusion-bonded body 100. To be concrete, the groups of the first carbon fibers CF1 or the groups of the second carbon fibers CF2 in the fusion-bonded part 101 are arranged in much more layers in the first direction DA than in the first resin plate part 113A and the second resin plate part 123A.

A method of producing the fusion-bonded body 100 in the first reference example will be explained below.

Figure 2A:
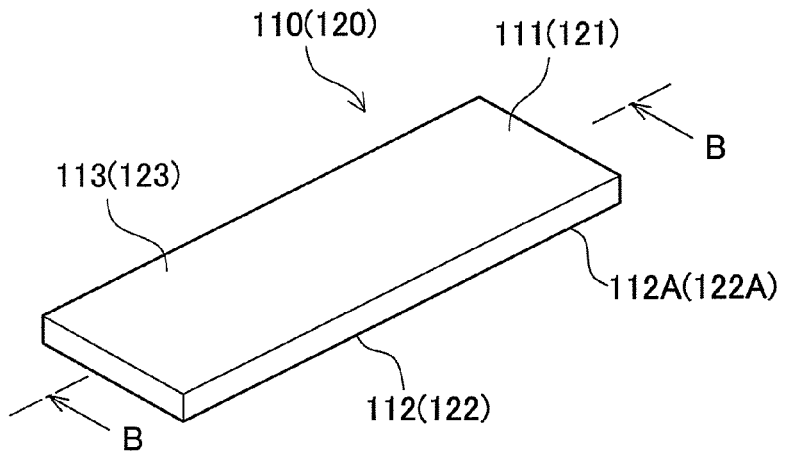
FIG. 2A is a perspective view to explain first and second resin members in the first reference example.
Figure 2B:
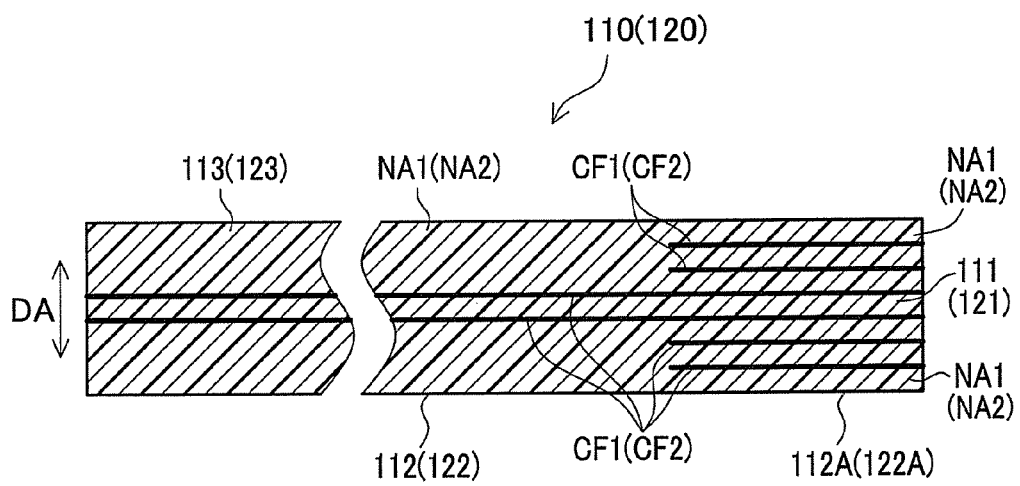
FIG. 2B is a partial enlarged sectional view (along B-B) of FIG. 2A.

The fusion-bonded body 100 in the first reference example is, as already stated, produced by fusion-bonding the first resin member 110 and the second resin member 120. The first resin member 110 is therefore firstly explained. FIGS. 2A and 2B show a perspective view and an enlarged sectional view of this first resin member 110.

The first resin member 110 is a resin composite formed in a rectangular plate-like shape made of the first resin NA1 and the groups of first carbon fibers CF1. The groups of first carbon fibers CF1 are oriented in layers and almost perpendicularly to the thickness direction DA (the vertical direction in FIG. 2B) in the first resin member 110. The layers of the first carbon fibers CF1 are arranged in almost parallel with each other.

An end of the first resin member 110 is a first part to be fusion-bonded (a "first to-be-fusion-bonded part") 111 that is to be fusion-bonded with the second resin member 120.

This first to-be-fusion-bonded part 111 is higher in the percentage content of the first carbon fibers CF1 than other portion 113 of the first resin member 110. To be concrete, the first to-be-fusion-bonded part 111 contains the groups of layered first carbon fibers CF1 arranged in much more layers than in the other portion 113. The percentage content of the first carbon fibers CF1 in the first to-be-fusion-bonded part 111 is set to 65 wt %.

Of a first principal surface 112 of the first resin member 110, a portion included in the first to-be-fusion-bonded part 111 (a portion to be brought into contact with the second resin member 120) is referred to as a first contact surface 112A.

The second resin member 120 is explained below. This second resin member 120 is a resin composite formed in a rectangular plate-like shape made of the second resin NA2 and the second carbon fibers CF2. As shown in FIG. 2B, the groups of second carbon fibers CF2 are oriented in layers and almost perpendicular to the thickness direction DA (the vertical direction in FIG. 2B) in the second resin member 120 as with the first resin member 110. The layers of the second carbon fibers CF2 are arranged in almost parallel with each other.

An end of the second resin member 120 is a second part to be fusion-bonded (a "second to-be-fusion-bonded part") 121 that is to be fusion-bonded with the first resin member 110. The second to-be-fusion-bonded part 121 is higher in the percentage content of the second carbon fibers CF2 than other portion 123 of the second resin member 120. To be concrete, the second to-be-fusion-bonded part 121 contains the group of layered second carbon fibers CF2 arranged in much more layers than in the other portion 123. The percentage content of the second carbon fibers CF2 in the second to-be-fusion-bonded part 121 is set to 65 wt %.

Of a second principal surface 122 of the second resin member 120, a portion included in the second to-be-fusion-bonded part 121 (a portion to be brought into contact with the first resin member 110) is referred to as a second contact surface 122A.

A method of producing the first resin member 110 is explained below referring to FIGS. 3 and 4.

Figure 3:
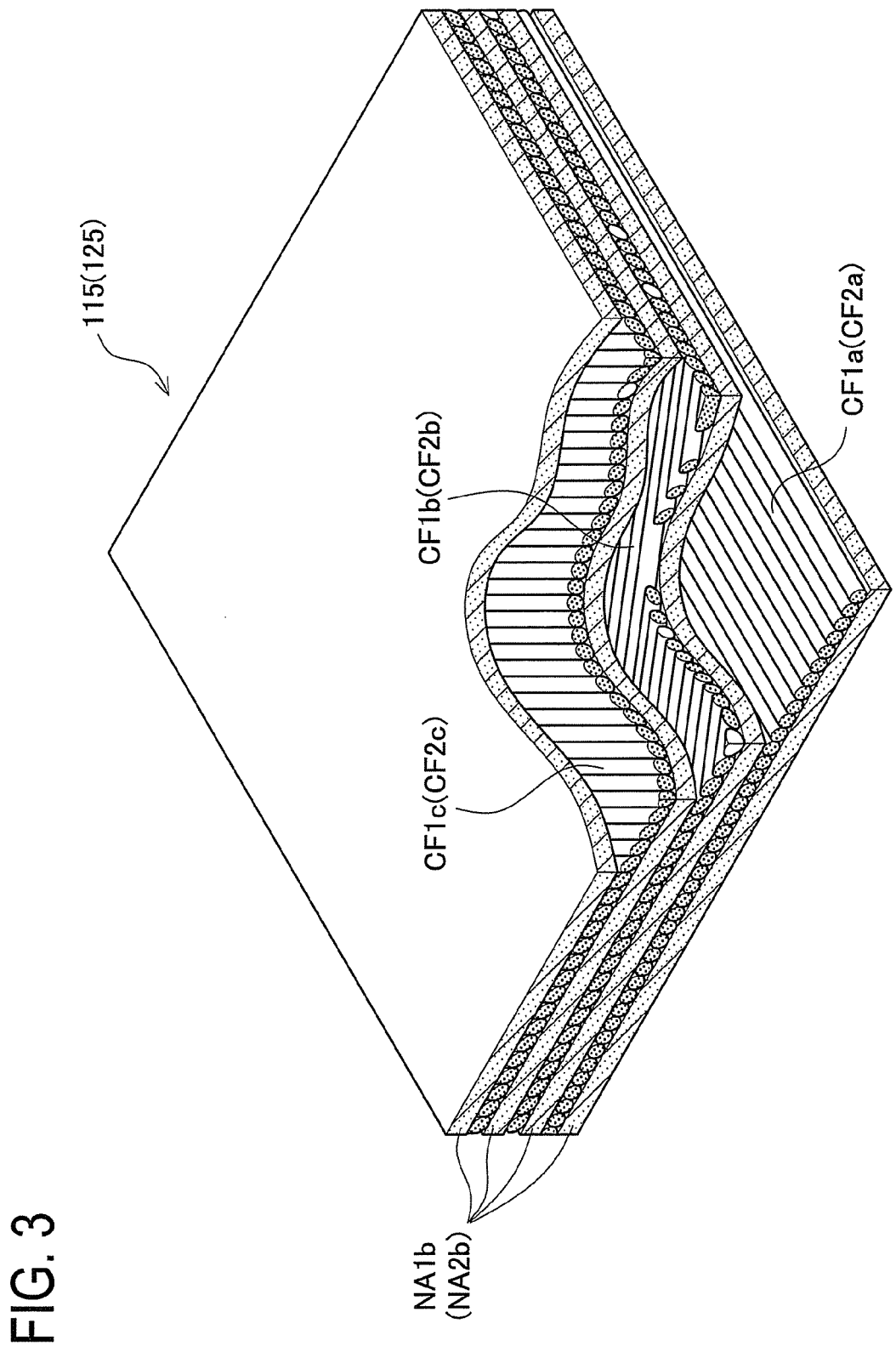
FIG. 3 is an explanatory view of first and second base materials in the first reference example and a first embodiment.

As shown in FIG. 3, first resin nonwoven fabrics NA1b made of nylon 66 and the layers of the groups of first carbon fibers CF1 arranged (oriented) in the same direction are alternately laminated to form a first base material 115. As the layers of the first carbon fibers CF1, the groups of layered carbon fibers composed of three kinds of carbon fibers extending in different directions (orientations); specifically, a group of first A-orientation carbon fibers CF1a (orientation 0°), a group of first B-orientation carbon fibers CF1b (orientation 60°), and a group of first C-orientation carbon fibers CF1c (orientation −60°). It is to be noted that the first A-orientation carbon fiber group CF1a, the first B-orientation carbon fiber group CF1b, and the first C-orientation carbon fiber group CF1c are laminated in this order.

Figure 4:
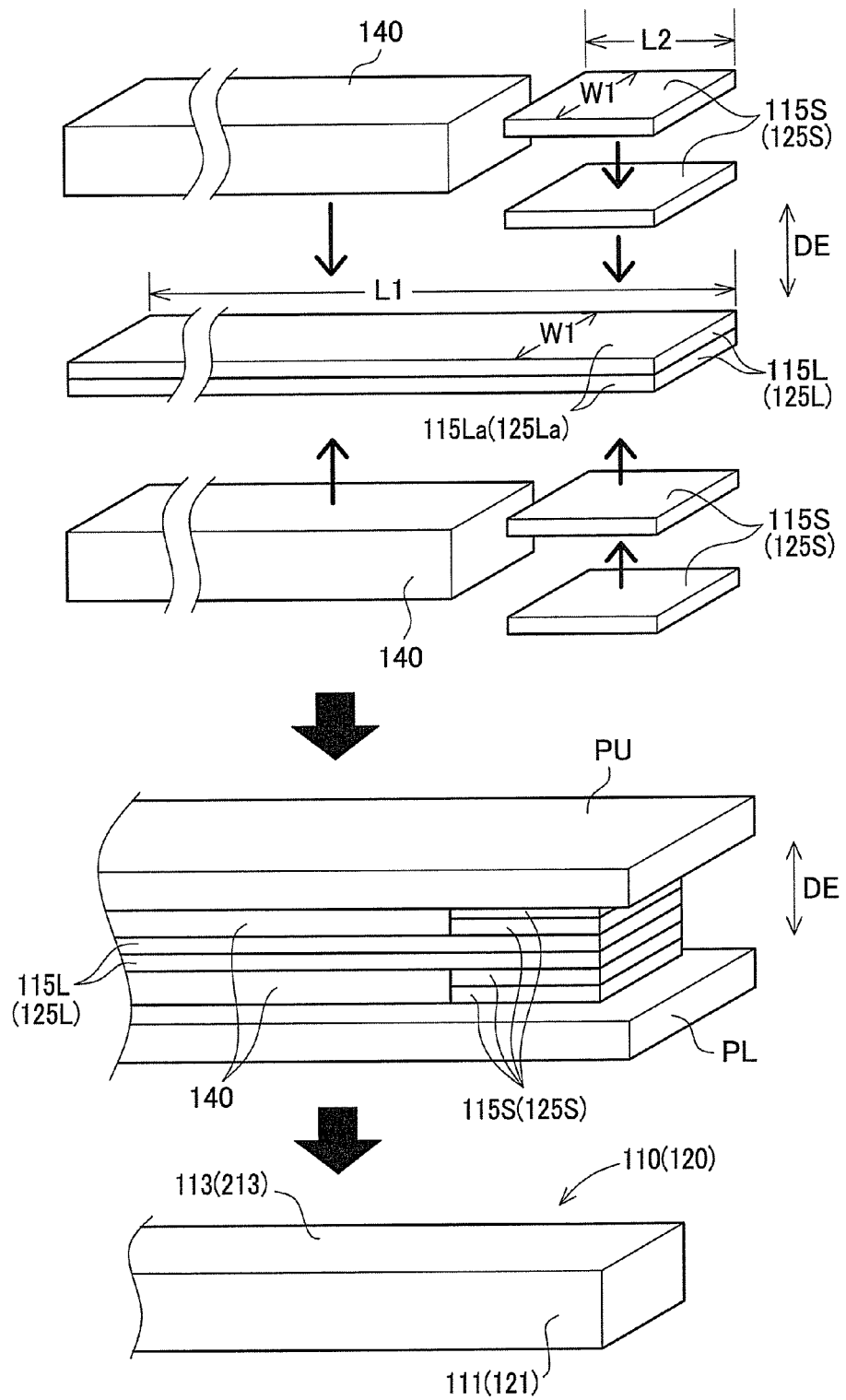
FIG. 4 is an explanatory view of a producing method of the first and second resin members in the first reference example.

The aforementioned first base material 115 is cut to form first long base materials 115L each having a width W1 and a length L1 and first short base materials 115S each having a width W1 and a length L2 (L2<L1) (see an upper view in FIG. 4). Furthermore, two of the first long base materials 115L are laminated. Each two first short base materials 115S are laminated on and under end portions 115La of the base materials 115L. On the other hand, of the two-layered first long base materials 115L, portions on which the first short base materials 115S are not laminated are respectively covered by resin nonwoven fabrics 140 made of nylon 66.

A laminated body including the first long base materials 115L, the first short base materials 115S, and the resin nonwoven fabrics 140 is sandwiched under pressure and thus heated by an upper hot plate PU and a lower hot plate PL (a middle view in FIG. 4). To be concrete, the upper hot plate PU and the lower hot plate PL each being a flat plate are heated to 300° C. and the laminated body is held under pressure at 300° C. for 20 minutes. After that, the laminated body is slowly cooled down to 200° C. and then detached from the hot plates.

According to the above steps, the first resin member 110 is produced (a lower view in FIG. 4).

A method of producing the second resin member 120 is achieved by, as with the method of producing the first resin member 110, sandwiching the layered carbon fiber groups composed of carbon fibers extending in different three orientations (a group of second A-orientation carbon fibers CF2a (orientation 0°), a group of second B-orientation carbon fibers CF2b (orientation 60°), and a group of second C-orientation carbon fibers CF2c (orientation −60°)) between second resin nonwoven fabrics NA2b to form a second base material 125.

The aforementioned second base material 125 is cut to form second long base materials 125L each having a width W1 and a length L1 and second short base materials 125S each having a width W1 and a length L2 (L2<L1) (see an upper view in FIG. 4). Furthermore, two of the long base materials 125L are laminated. Each two second short base materials 125S are laminated on and under end portions 125La of the base materials 125L. On the other hand, of the two-layered second long base materials 125L, portions on which the second short base materials 125S are not laminated are respectively covered by resin nonwoven fabrics 140 made of nylon 66.

Furthermore, a laminated body including the second long base materials 125L, the second short base materials 125S, and the resin nonwoven fabrics 140 is sandwiched under pressure and thus heated by an upper hot plate PU and a lower hot plate PL (a middle view in FIG. 4). To be concrete, the upper hot plate PU and the lower hot plate PL each being a flat plate are heated to 300° C. and the laminated body is held under pressure at 300° C. for 20 minutes. After that, the laminated body is slowly cooled down to 200° C. and then detached from the hot plates.

According to the above steps, the second resin member 120 is produced (a lower view in FIG. 4).

Figure 5A:
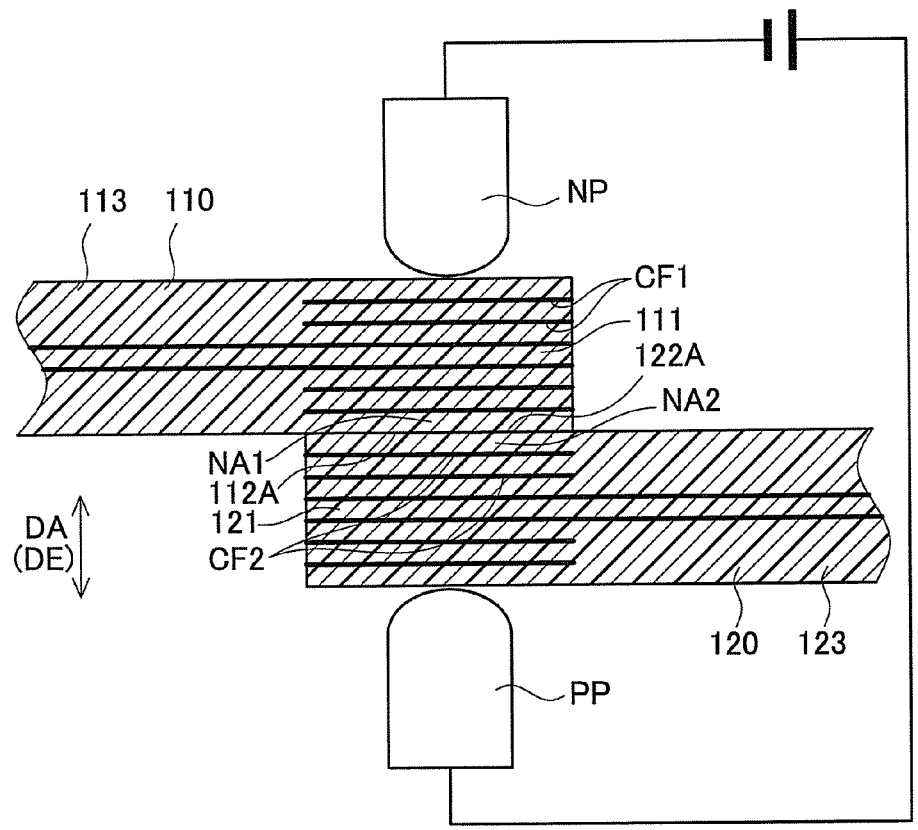
FIG. 5A is an explanatory view of a fusion-bonding step in the first reference example.

A method of fusion-bonding the first resin member 110 and the second resin member 120 in the first reference example will be explained below referring to FIGS. 5A and 5B.

The fusion-bonding method begins with bringing the first contact surface 112A of the above first resin member 110 and the second contact surface 122A of the second resin member 120 into close contact with each other. Accordingly, the first to-be-fusion-bonded part 111 and the second to-be-fusion-bonded part 121 overlap each other (FIG. 5A) in the thickness direction DA (a vertical direction in FIG. 5B). The first and second to-be-fusion-bonded parts 111 and 121 are held under pressure between semi-spherical leading ends of electrodes (a positive electrode PP and a negative electrode NP) each having an almost columnar shape.

Between the first to-be-fusion-bonded part 111 and the second to-be-fusion-bonded part 121 pressed against each other, a voltage is supplied through the electrodes PP and NP to flow electric current. Specifically, a voltage is applied between the positive electrode PP and the negative electrode NP holding therebetween the first and second to-be-fusion-bonded parts 111 and 121 under pressure to supply a current of 100000 A for 2.8 seconds. Since the current mainly passes through the first carbon fibers CF1 and the second carbon fibers CF2, the first and second to-be-fusion-bonded parts 111 and 121 entirely become low in resistance and allow the current to easily pass through.

This current supply causes the first carbon fibers CF1, the second carbon fibers CF2, and other to heat. Thus, the first resin NA1 in the first to-be-fusion-bonded part 111 of the first resin member 110 and the second resin NA2 in the second to-be-fusion-bonded part 121 of the second resin member 120 are melted and fusion-bonded to each other, and then solidified, thereby forming the fusion-bonded part 101.

Figure 5B:
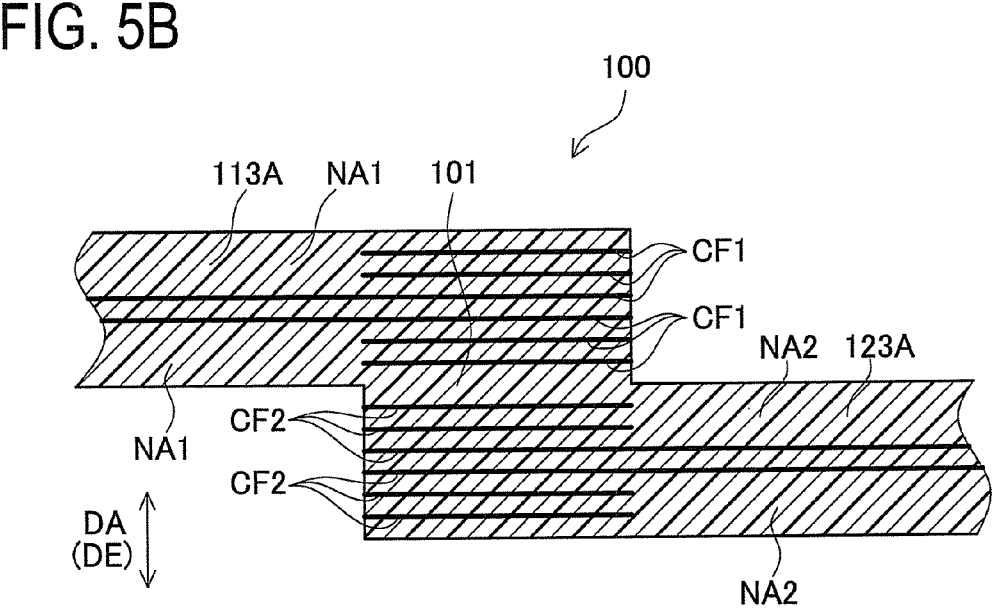
FIG. 5B is an explanatory view of a fusion-bonded body after the fusion-bonding step in the first reference example.

As above, the fusion-bonded body 100 composed of the first resin member 110 and the second resin member 120 fusion-bonded to each other is completed (FIG. 5B).

The method of producing the fusion-bonded body 100 in the first reference example includes the fusion-bonding step of bringing the first to-be-fusion-bonded part 111 and the second to-be-fusion-bonded part 121 into close contact with each other, supplying current to them to cause heating, to form the fusion-bonded part 101. According to this method, the fusion-bonded body 100 can be easily produced in which the first to-be-fusion-bonded part 111 and the second to-be-fusion-bonded part 121 are fusion-bonded.

In the first reference example, the first to-be-fusion-bonded part 111 of the first resin member 110 contains the first carbon fibers CF1 in larger amount than in the other portion 113. Similarly, the second to-be-fusion-bonded part 121 of the second resin member 120 contains the second carbon fibers CF2 in larger amount than in the other portion 123. Consequently, when current supply is to be made through the first and second to-be-fusion-bonded parts 111 and 121, a larger amount of current can be supplied. The first and second to-be-fusion-bonded parts 111 and 121 can therefore reliably heated to form the fusion-bonded part 101 without fail. On the other hand, the other portions 113 and 123 contain appropriate percentage contents (e.g., 40 wt % in the first reference example) of the carbon fibers CF1 and CF2 according to other purposes (characteristics such as desired strength and coefficient of elasticity).

Furthermore, the first and second to-be-fusion-bonded parts 111 and 121 contain 60 to 90 wt % (concretely, 65 wt %) of the first carbon fibers CF1 and 60 to 90 wt % (concretely, 65 wt %) of the second carbon fibers CF2, respectively. Thus, when they are placed in close contact and supplied with current, current supply can be made reliably through the first carbon fibers CF1 and the second carbon fibers CF2. The current flowing also causes the first carbon fibers CF1 and the second carbon fibers CF2 to heat, thereby surely melting the first resin NA1 and the second resin NA2 in the first to-be-fusion-bonded part 111 or the second to-be-fusion-bonded part 121. Accordingly, the fusion-bonded body 100 can be produced in which the first to-be-fusion-bonded part 111 and the second to-be-fusion-bonded part 121 are reliably fusion-bonded to each other.

The first resin member 110 corresponds to a first resin part, the second resin member 120 corresponds to a second resin part, the first resin plate part 113 and the second resin plate part 123 correspond to other portions respectively, the first resin NA1 corresponds to a first thermoplastic resin, and the second resin NA2 corresponds to a second thermoplastic resin.

First Embodiment

A first embodiment of the present invention will be explained referring to FIGS. 3, 6A to 10B.

A fusion-bonded body in the first embodiment is identical to that in the first reference example excepting the orientation direction of carbon fibers in the fusion-bonded part.

The following explanation is therefore focused on the differences. The explanation on the same or similar parts or components is not repeated or is simplified. The same or similar parts or components can provide the same operations and advantages. The same or similar parts or components are given the same reference signs.

Figure 6A:
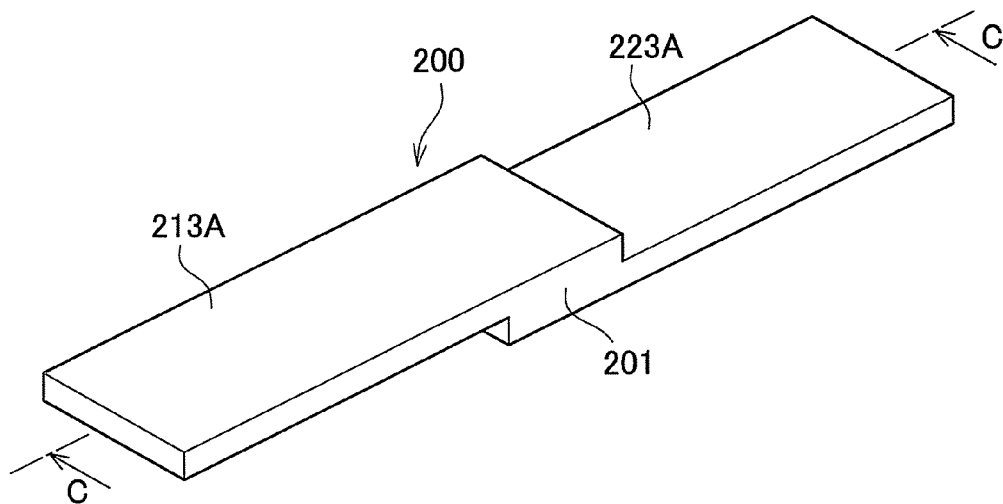
FIG. 6A is a perspective view of a fusion-bonded body in the first embodiment.
Figure 6B:
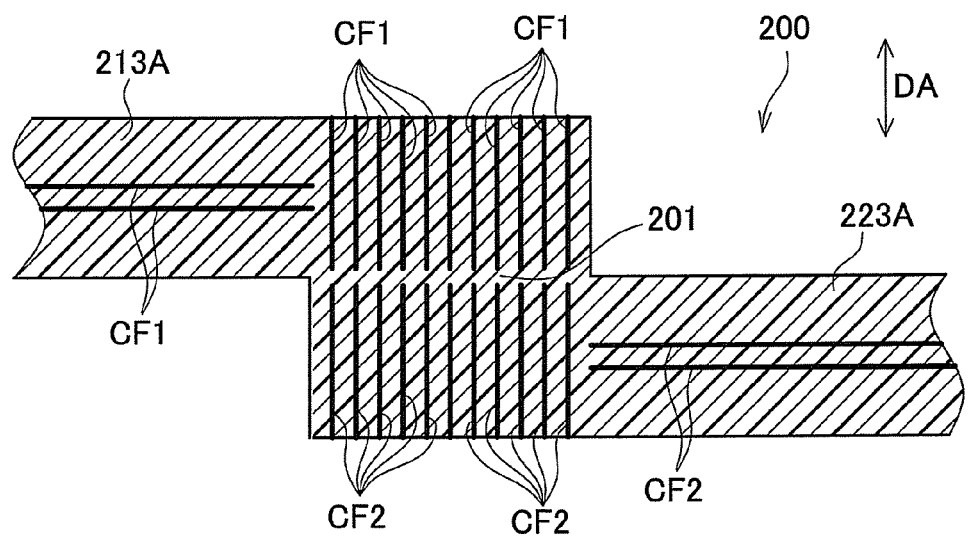
FIG. 6B is a partial enlarged sectional view (along C-C) of FIG. 6A.

FIGS. 6A and 6B show a fusion-bonded body 200 in the first embodiment; FIG. 6A is a perspective view and FIG. 6B is a sectional view taken along a line C-C. This fusion-bonded body 200 includes, as with the fusion-bonded body 100 in the first reference example, a first resin plate part 213A having a rectangular plate-like shape made of first resin NA1 (nylon 66) and groups of first carbon fibers CF1, a second resin plat part 223A having a rectangular plate-like shape made of second resin NA2 (nylon 66) and groups of second carbon fibers CF2, and a fusion-bonded part 201 formed between the first resin plate part 213A and the second resin plate part 223A. As described later, this fusion-bonded body 200 is produced by fusion-bonding a first resin member 210 having a rectangular plate-like shape made of the first resin NA1 and the first carbon fibers CF1 and a second resin member 220 having a rectangular plate-like shape made of the second resin NA2 and the second carbon fibers CF2.

Of this fusion-bonded body 200, as with the first reference example, the first carbon fibers CF1 in the first resin plate part 213A are oriented perpendicular to the thickness direction DA. Similarly, the second carbon fibers CF2 in the second resin plate part 223A are oriented perpendicular to the thickness direction DA.

In the fusion-bonded part 201 of the fusion-bonded body 200, as with the first reference example, the first resin NA1 and the second resin NA2 are melted and solidified together into an integral part. However, in this fusion-bonded part 201, different from the first reference example, a part of the groups of first carbon fibers CF1 and a part of the groups of second carbon fibers CF2 are oriented in parallel with the thickness direction DA (a vertical direction in FIG. 6B). In other words, a part of the groups of first carbon fibers CF1 and a part of the groups of second carbon fibers CF2 are oriented in parallel.

A method of producing the fusion-bonded body 200 in the first embodiment will be explained below.

Figure 7A:
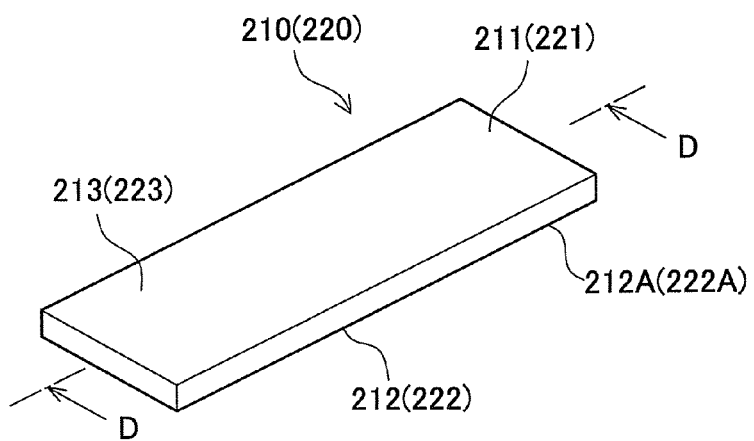
FIG. 7A is a perspective view of first and second resin members in the first embodiment.
Figure 7B:
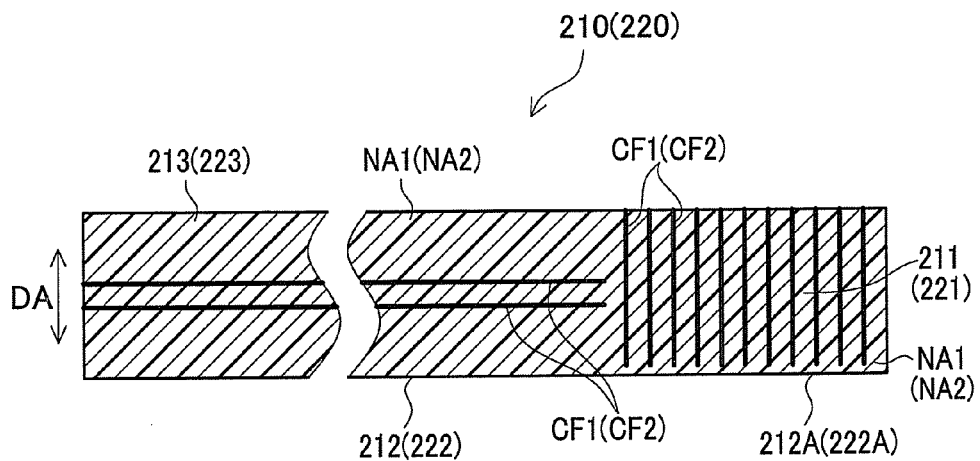
FIG. 7B is a partial enlarged sectional view (along D-D) of FIG. 7A.

The fusion-bonded body 200 in the first embodiment is as already stated, produced by fusion-bonding the first resin member 210 and the second resin member 220. The first resin member 210 is therefore firstly explained. FIGS. 7A and 7B show a perspective view and an enlarged sectional view of this first resin member 210.

The first resin member 210 is a resin composite formed in a rectangular plate-like shape made of the first resin NA1 and the groups of first carbon fibers CF1. The groups of first carbon fibers CF1 includes, as shown in FIG. 7B, groups of carbon fibers oriented in the direction perpendicular to the thickness direction DA (a vertical direction in FIG. 7B) as with the first reference example and groups of carbon fibers oriented in the direction parallel with the thickness direction DA. Specifically, the groups of first carbon fibers CF1 include the groups of carbon fibers oriented in the thickness direction DA in a first to-be-fusion-bonded part 211 corresponding to one end of the first resin member 210 and include the groups of carbon fibers oriented in the direction perpendicular to the thickness direction DA in other portion 213.

Of a first principal surface 212 of the first resin member 210, a portion included in the first to-be-fusion-bonded part 211 (a portion to be brought into contact with the second resin member 220) is referred to as a first contact surface 212A. This can be considered that the first to-be-fusion-bonded part 211 includes the groups of first carbon fibers CF1 (CF1a) oriented in the direction perpendicular to the first contact surface 212A.

A percentage content of the first carbon fibers CF1 in the first to-be-fusion-bonded part 211 is determined to be larger than in the other portion 213, specifically, 60 wt %.

The second resin member 220 is also a resin composite formed in a rectangular plate-like shape made of the second resin NA2 and the second carbon fibers CF2. The groups of second carbon fibers CF2 include groups of carbon fibers oriented in the thickness direction DA and the groups of carbon fibers oriented in the direction perpendicular to the thickness direction DA in the other portion 223.

Of a second principal surface 222 of the second resin member 220, a portion included in the second to-be-fusion-bonded part 221 (a portion to be brought into contact with the first resin member 210) is referred to as a second contact surface 222A. This can be considered that the second to-be-fusion-bonded part 221 include the groups of second carbon fibers CF2 (CF2a) oriented in the direction perpendicular to the second contact surface 222A.

A percentage content of the second carbon fibers CF2 in the second to-be-fusion-bonded part 221 is determined to be larger than in the other portion 223, specifically, 60 wt %.

A method of producing the first resin member 210 will be explained below referring to FIGS. 8A to 8C and 9.

Figure 8A:
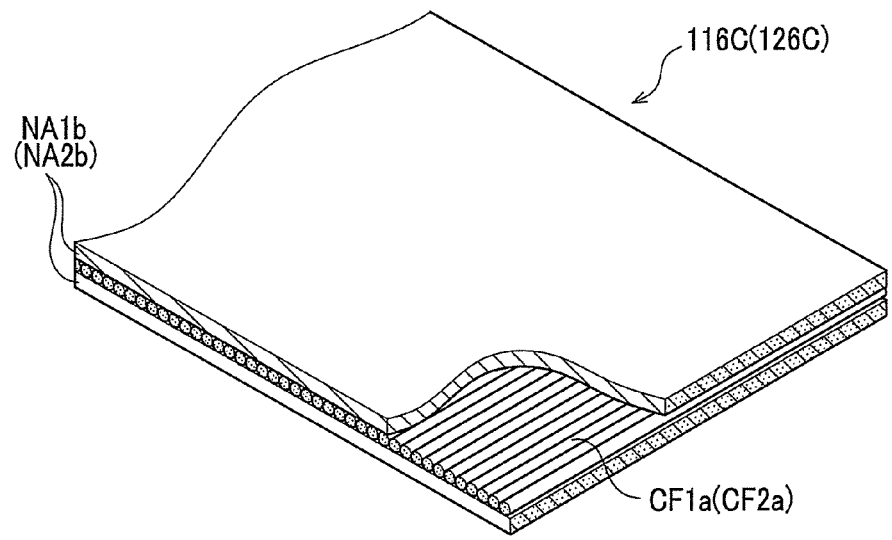
FIG. 8A is a perspective view of first and second single orientation cut base materials of first and second wound base materials in the first embodiment.
Figure 8B:
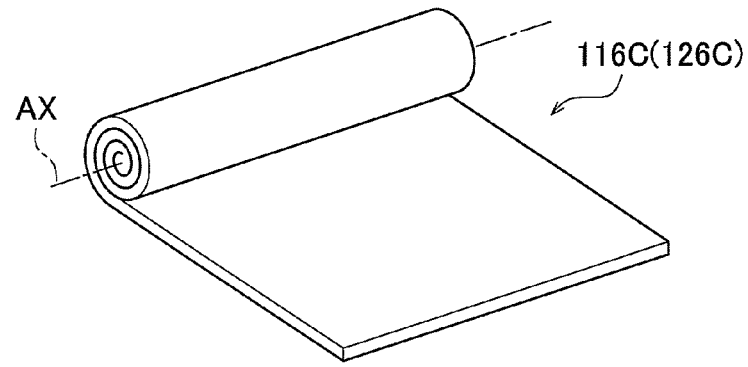
FIG. 8B is a perspective view showing an intermediate step of winding the first and second wound base materials in the first embodiment.
Figure 8C:
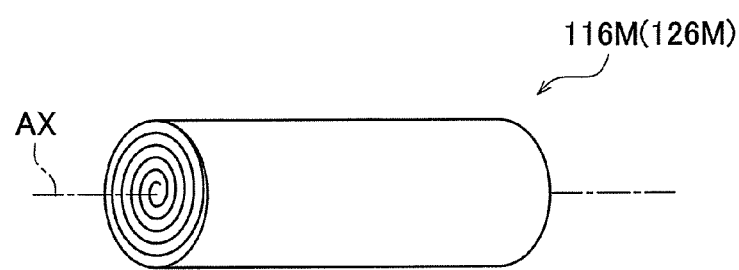
FIG. 8C is a perspective view of the first and second wound base materials in the first embodiment.
Figure 9:
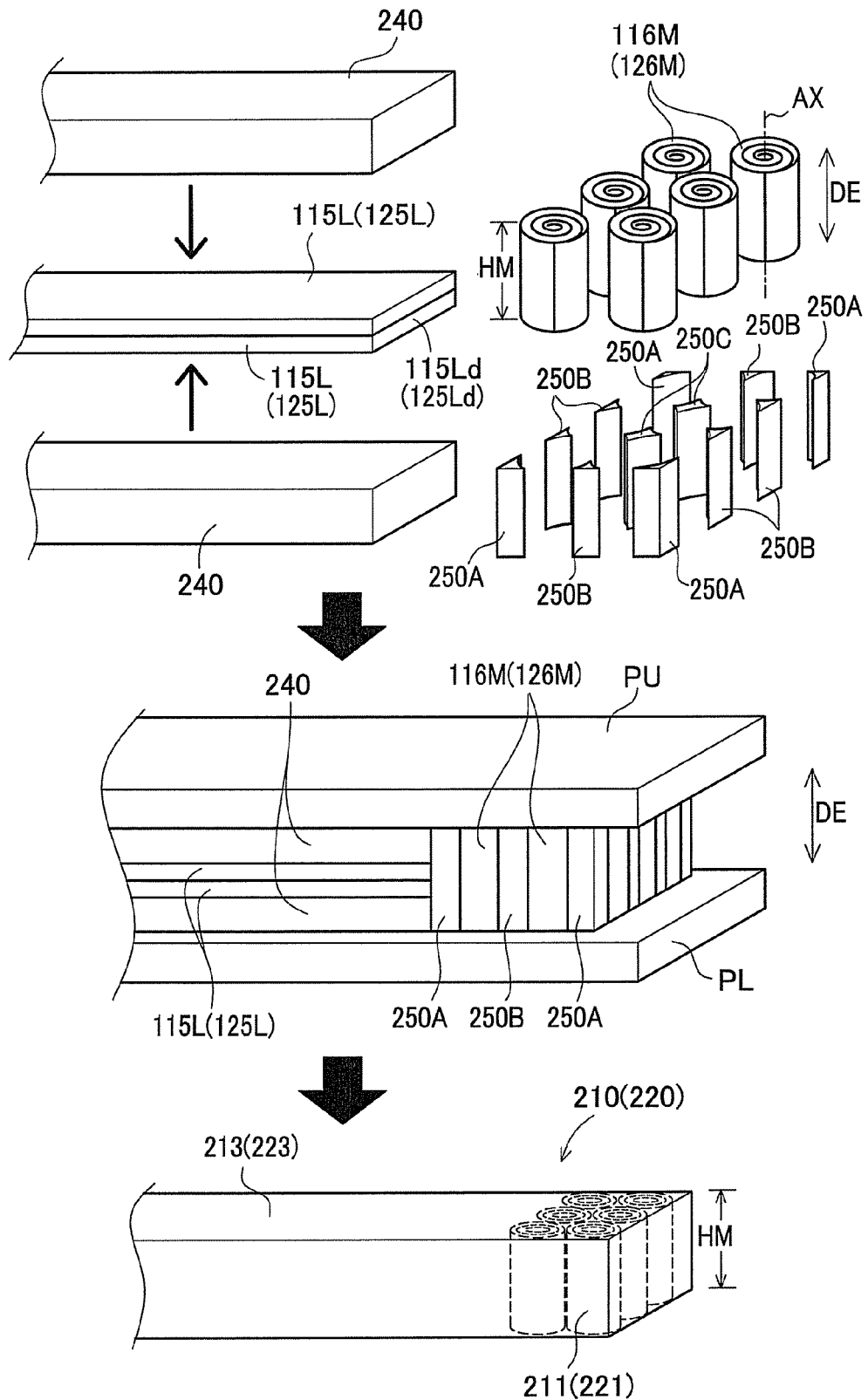
FIG. 9 is an explanatory view of a producing method of the first and second resin members in the first embodiment.

FIG. 8C shows a columnar-shaped first wound base material 116M for a base material of the first resin member 210. This first wound base material 116M is produced by winding a band-shaped first single-orientation cut base material 116C (FIG. 8A) used as the aforementioned first base material 115 about an axis AX parallel with the orientation direction of first A-orientation carbon fibers CF1a (see FIG. 8B). In the base material 116C, the first A-orientation carbon fibers CF1a are held between first resin nonwoven fabrics NA1b. In the thus produced first wound base material 116M, a group of the first A-orientation carbon fibers CF1a (orientation 0°) is oriented in parallel with the axis AX respectively.

By using the above first wound base material 116M and the aforementioned first long base material 115L, the first resin member 210 is produced. Specifically, a plurality of the first wound base materials 116M are arranged in a lattice pattern on the side of one end faces 115Ld side of two laminated first long base materials 115L. In this state, the first wound base materials 116M are arranged so that the axis AX of each base material 116M is parallel with the lamination direction DE (a vertical direction in FIG. 9) of the first long base materials 115L. Accordingly, the groups of first A-orientation carbon fibers CF1a in each first wound base material 116M are placed in parallel with the lamination direction DE.

Furthermore, resin nonwoven fabrics 240 made of nylon 66 are placed to cover the two-layered first long base materials 115L from above and below in the lamination direction DE so that the height of this lamination body is almost equal to the height HM of each first wound base material 116M. Between adjacent ones of the first wound base materials 116M or in a gap between the first long base materials 115L and the first wound base materials 116M, blocks 250A, 250B, and 250C formed of resin nonwoven fabric made of nylon 66 are placed. As above, a rectangular plate-like shaped component is produced from the first wound base materials 116M, the first long base materials 115L, the resin nonwoven fabrics 240, and the resin nonwoven fabric blocks 250A to 250C.

This component is sandwiched under pressure and then heated by an upper hot plate PU and a lower hot plate PL (a middle view in FIG. 9) as with the first reference example. The first resin member 210 is finally produced (a lower view in FIG. 9).

A method of producing the second resin member 220 is similar to the producing method of the first resin member 210. Specifically, a columnar-shaped second wound base material 126M is produced by winding a band-shaped second cut base material 126C (FIG. 8A) also used as the second base material 125 in which second A-orientation carbon fibers CF2$a$ are sandwiched between second resin nonwoven fabrics NA2$b$ about an axis AX parallel with an orientation direction of the second A-orientation carbon fibers CF2$a$ (see FIG. 8B). In each of the thus produced second wound base materials 126M, the group of second A-orientation carbon fibers CF2$a$ (orientation 0°) is oriented in parallel with the axis AX.

By use of the aforementioned second wound base materials 126M and the second long base materials 125L, the second resin member 220 is produced. To be concrete, a plurality of the second wound base materials 126M are arranged in a lattice pattern on the side of one end faces 125Ld of the two layered second long base materials 125L. In this state, the second wound base materials 126M are arranged so that the axis AX of each base material 126M is parallel with the lamination direction DE of the second long base materials 125L. Accordingly, the groups of second A-orientation carbon fibers CF2$a$ in each second wound base material 126M are placed in parallel with the lamination direction DE.

Furthermore, as with the first base material 210, a rectangular component is produced from the second wound base materials 126M, the second long base materials 125L, the resin nonwoven fabrics 240, and the resin nonwoven fabric blocks 250A to 250C.

This component is sandwiched under pressure and then heated by an upper hot plate PU and a lower hot plate PL (a middle view in FIG. 9) as with the first reference example. The second resin member 220 is finally produced (a lower view in FIG. 9).

Figure 10A:
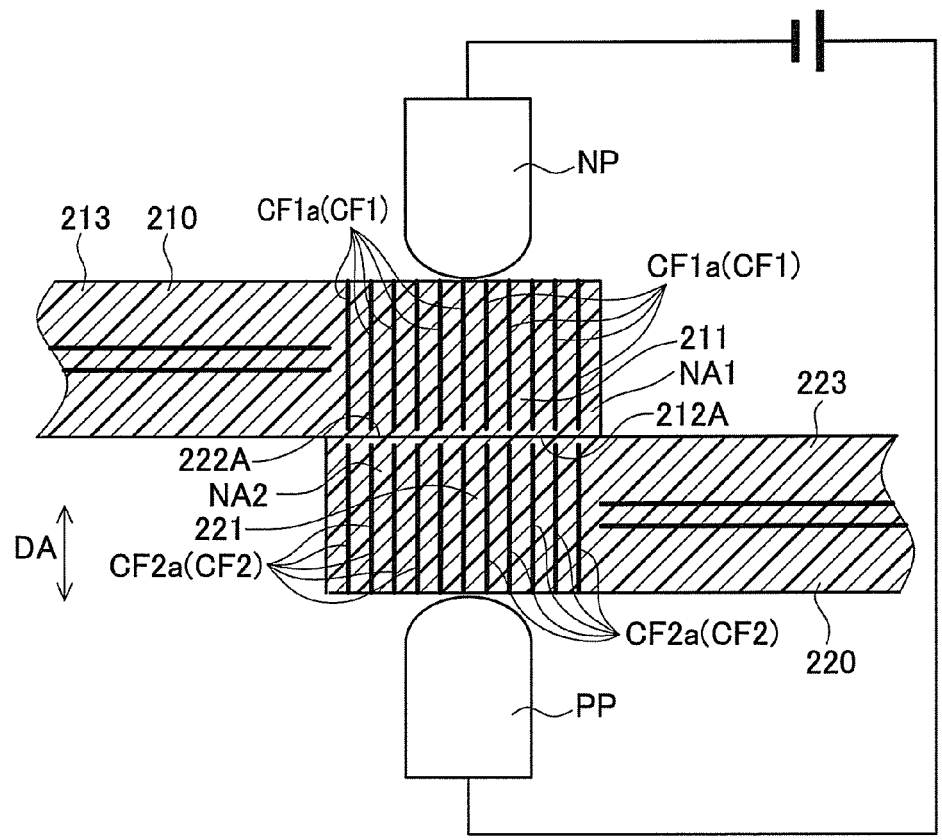
FIG. 10A is an explanatory view of a fusion-bonding step in the first embodiment.

A method of fusion-bonding the first resin member 210 and the second resin member 220 in the first embodiment will be explained below referring to FIGS. 10A and 10B.

The fusion-bonding method begins with bringing the first contact surface 212A of the first resin member 210 and the second contact surface 222A of the second resin member 220 into close contact with each other. Thus, the first to-be-fusion-bonded part 211 and the second to-be-fusion-bonded part 221 overlap each other (FIG. 10A) in the thickness direction (a vertical direction in FIG. 10B). Then, the first and second to-be-fusion-bonded parts 211 and 221 are sandwiched under pressure between semi-spherical leading ends of electrodes (a positive electrode PP and a negative electrode NP) each having an almost columnar shape.

Between the first to-be-fusion-bonded part 211 and the second to-be-fusion-bonded part 221 pressed against each other, a voltage is supplied through the electrodes PP and NP to flow electric current. In the first to-be-fusion-bonded part 211 and the second to-be-fusion-bonded part 221, therefore, the current flows through the groups of first A-orientation carbon fibers CF1$a$ oriented perpendicular to the first contact surface 212A and the groups of second A-orientation carbon fibers CF2$a$ oriented perpendicular to the second contact surface 222A.

A larger amount of current can be supplied to the groups of first A-orientation carbon fibers CF1$a$ and the groups of second A-orientation carbon fibers CF2$a$, thereby heating them. Accordingly, the first resin NA1 in the first to-be-fusion-bonded part 211 of the first resin member 210 and the second resin NA2 in the second to-be-fusion-bonded part 221 of the second resin member 220 are melted and fusion-bonded to each other, and then solidified, thereby forming the fusion-bonded part 201.

Figure 10B:
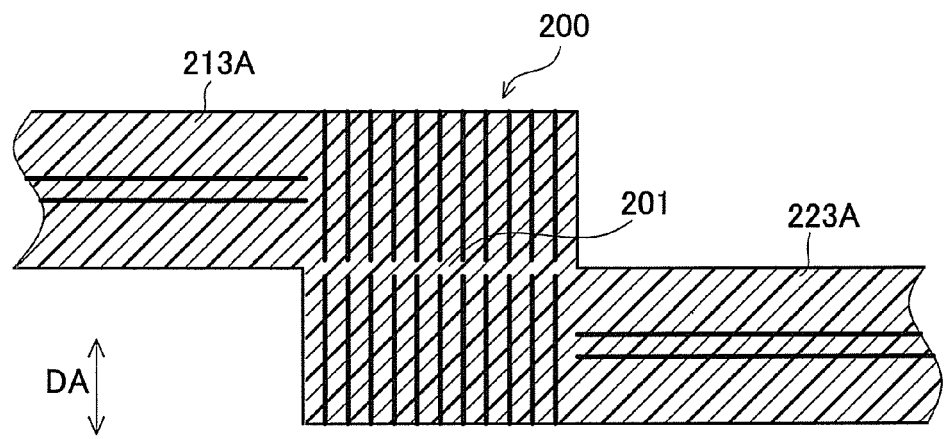
FIG. 10B is an explanatory view of a fusion-bonded body after the fusion-bonding step in the first embodiment.

As above, the fusion-bonded body 200 composed of the first resin member 210 and the second resin member 220 fusion-bonded to each other is completed (FIG. 10B).

In the first embodiment, current is supplied in the orientation direction of the first A-orientation carbon fibers CF1$a$ and the second A-orientation carbon fibers CF2$a$. The current is therefore caused to flow along the groups of first A-orientation carbon fibers CF1$a$ and the groups of second A-orientation carbon fibers CF2$a$ and the first to-be-fusion-bonded part 211 and the second to-be-fusion-bonded part 221 become lower in resistance than in the first reference example and allow a large amount of current to easily and reliably pass through. This can generate a large amount of heat, thereby reliably melting the first resin NA1 and the second resin NA2 in the first to-be-fusion-bonded part 211 and the second to-be-fusion-bonded part 221 respectively. Consequently, the fusion-bonded body 200 can be produced in which the first to-be-fusion-bonded part 211 and the second to-be-fusion-bonded part 221 are reliably fusion-bonded to each other.

The present invention is explained above along the first reference example and the first embodiment but not limited thereto. The present invention may be embodied in other specific forms without departing from the essential characteristics thereof.

For instance, the aforementioned first reference example and first embodiment show the examples in which the first to-be-fusion-bonded parts 111 and 211 are included in the first resin members 110 and 210 and the second to-be-fusion-bonded parts 121 and 221 are included in the second resin members 120 and 220 different from the first resin members, respectively. As an alternative, the first to-be-fusion-bonded part and the second to-be-fusion-bonded part may be included in a single member at different portions.

The first reference example and first embodiment show the examples in which the percentage content (weight %) of carbon fibers in the first to-be-fusion-bonded parts 111 and 211 in the first resin members 110 and 210 are set to be different from those in other portions 113 and 213. However, the contents of carbon fibers may be made equal in every portion. The second to-be-fusion-bonded parts 121 and 221 of the second resin members 120 and 220 also may be configured to have a percentage content of carbon fibers equal between the second to-be-fusion-bonded parts 121 and 221 and the other portions 123 and 223 of the second resin members 120 and 220.

In the first reference example and first embodiment, on the other hand, the portions 113 and 213 other than the first to-be-fusion-bonded parts 111 and 211 are also formed of the first resin members 110 and 210 made of the first carbon fibers CF1 and the first resin NA1 as with the first to-be-fusion-bonded parts 111 and 211. As an alternative, the other portions 113 and 213 may be made of metal, ceramic, the first resin NA1 or only different resin therefrom, or only carbon fibers, without containing one or both of thermoplastic first resin NA1 and carbon fibers CF1. The portions 123 and 223 other than the second to-be-fusion-bonded parts 121 and 221 also may be made of metal, ceramic, the second resin NA2 or only different resin therefrom, or only carbon fibers, without containing one or both of thermoplastic second resin NA2 and carbon fibers CF2.

Moreover, in the first reference example, the percentage contents of the carbon fibers CF1 and CF2 in the first to-be-fusion-bonded parts 111 and 211 and the second to-be-fusion-bonded parts 121 and 221 are equally 65 wt %. In the first embodiment, they are equally 60 wt %. Alternatively, the percentage contents may be determined to be different from each other in a range of 60 to 90 wt %.

The invention claimed is:

1. A method of producing a fusion-bonded body including a fusion-bonded part made of a first to-be-fusion-bonded part comprising first thermoplastic resin and first carbon fibers and a second to-be-fusion-bonded part comprising second thermoplastic resin and second carbon fibers, the first and second to-be-fusion-bonded parts being fusion-bonded to each other, the method comprising:

forming the fusion-bonded part by bringing the first to-be-fusion-bonded part and the second to-be-fusion-bonded part into contact with each other, flowing current through both to-be-fusion-bonded parts to heat themselves, and melting and solidifying the first thermoplastic resin and the second thermoplastic resin together, wherein, the fusion-bonded body is produced by fusion-bonding a first resin part made of a material containing at least the first thermoplastic resin, the first resin part including the first to-be-fusion-bonded part, and a second resin part made of a material containing at least the second thermoplastic resin, the second resin part including the second to-be-fusion-bonded part, thereby forming the fusion-bonded part, the first to-be-fusion-bonded part is formed to have a larger content of the first carbon fibers than another portion of the first resin part, the second to-be-fusion-bonded part is formed to have a larger content of the second carbon fibers than another portion of the second resin part, the first to-be-fusion-bonded part includes groups of first perpendicular carbon fibers oriented in a direction perpendicular to a first contact surface to be brought into contact with the second to-be-fusion-bonded part, and the second to-be-fusion-bonded part includes groups of second perpendicular carbon fibers oriented in a direction perpendicular to a second contact surface to be brought into contact with the first to-be-fusion-bonded part.

2. The method of producing a fusion-bonded body according to claim 1, wherein each of the first to-be-fusion-bonded part and the second to-be-fusion-bonded part contains carbon fibers in a range of 60 to 90 wt %.

* * * * *